(12) United States Patent
Lang et al.

(10) Patent No.: US 6,468,172 B1
(45) Date of Patent: Oct. 22, 2002

(54) MECHANICAL TENSIONER WITH ACOUSTIC DAMPENING FEATURE

(75) Inventors: Andreas Lang, Forchheim; Holger Konanz, Erlangen, both of (DE)

(73) Assignee: INA Wälzlager Schaeffler OHG, Herzogenaurach (DE)

( * ) Notice: Subject to any disclaimer, the term of this patent is extended or adjusted under 35 U.S.C. 154(b) by 0 days.

(21) Appl. No.: 09/667,262

(22) Filed: Sep. 22, 2000

(30) Foreign Application Priority Data

Sep. 25, 1999 (DE) .......................................... 199 46 057

(51) Int. Cl.[7] ................................................ F16H 7/12
(52) U.S. Cl. ...................................................... 474/135
(58) Field of Search .............................. 474/135, 133, 474/112, 109, 101, 138, 136

(56) References Cited

U.S. PATENT DOCUMENTS

| 4,952,197 A | * | 8/1990 | Henderson .................. 474/135 |
| 5,236,396 A | * | 8/1993 | Golovatai-Schmidt et al. .. 474/101 |
| 5,391,119 A | * | 2/1995 | Kondo et al. ................ 474/112 |
| 5,449,328 A | * | 9/1995 | Schmidt et al. .............. 474/135 |
| 5,503,599 A | | 4/1996 | Brehler et al. |
| 5,702,314 A | * | 12/1997 | Schmid ......................... 474/94 |
| 5,718,649 A | | 2/1998 | Hong et al. |

FOREIGN PATENT DOCUMENTS

| DE | 37 42 030 C2 | 6/1989 |
| DE | 44 26 666 A1 | 2/1996 |

* cited by examiner

*Primary Examiner*—David A. Bucci
*Assistant Examiner*—Timothy McAnulty
(74) *Attorney, Agent, or Firm*—Henry M. Feiereisen

(57) ABSTRACT

A tensioner for a power transmission element of a traction drive, includes a housing, a swivel arm having a free end for connection to a rotatable tension roller which rests on the power transmission element, and a swivel bearing, including an axle for connection to the swivel arm and a bushing forming part of the housing and supporting the axle, for rotatably supporting the swivel arm in the housing. A spring is positioned in a peripheral zone of the swivel bearing between the swivel arm and the housing. Mounted in fixed rotative engagement to the axle and supported by the housing via a friction lining is a friction disk, with a disk-shaped first dampening element positioned between the friction lining and the housing.

22 Claims, 2 Drawing Sheets

MECHANICAL TENSIONER WITH ACOUSTIC DAMPENING FEATURE

CROSS-REFERENCES TO RELATED APPLICATIONS

This application claims the priority of German Patent Application Serial No. 199 46 057.4, filed Sep. 25, 1999, the subject matter of which is incorporated herein by reference.

BACKGROUND OF THE INVENTION

The present invention relates to a tensioner for a power transmission element, such as a chain or belt, of a traction drive for operating, for example, aggregates of an internal combustion engine.

Tensioners of this type automatically implement an even tensioning of the power transmission element. Typically, the mechanical tensioner includes a tension roller which rests against the power transmission element and is rotatably mounted to a swivel arm. The swivel arm is swingably arranged via an axle in a housing which is constrained against executing a rotational movement. A torsion spring tends to urge the tension roller in engagement with the power transmission element by a suitable force. The tensioner further includes a dampening system to dampen high-frequency adjustment movements of the tension roller and swivel arm, introduced by the traction drive into the tensioner in the form of impact loads. The dampening system includes a friction lining and a friction disk, with the friction disk mounted on the swivel arm distal end of the axle and held in abutment against a housing surface.

German Pat. No. DE 44 26 666 describes a tensioner having a friction disk which has one side provided with a circular friction lining that is urged in engagement with a confronting end face of the housing by a torsion spring which applies in addition to a force component upon the swivel arm in circumferential direction also an axial force between the swivel arm and the housing that tends to move apart the swivel arm and the housing. The housing of the tensioner has one end face formed with an axially projecting ring collar for embracing the friction disk on the outside and realizing a flush-mounted installation of the friction disk in the housing. During operation of the tensioner, noise may develop in the area of the adjoining contact surface between the housing and the friction lining and result in an annoying screeching sound, when the friction disk oscillates at high frequency. Due to the structure of this conventional tensioner, a structure-borne noise is transmitted from the friction lining onto friction disk as well as directly onto the housing so that noise radiates via the surface of the tensioner. In addition, the screeching noise compounds and amplifies the noise generated by the internal combustion engine.

SUMMARY OF THE INVENTION

It is thus an object of the present invention to provide an improved tensioner, obviating the afore-stated drawbacks.

In particular, it is an object of the present invention to provide an improved tensioner which effectively inhibits screeching noises between rubbing components.

These objects, and others which will become apparent hereinafter, are attained in accordance with the present invention by providing a housing, a swivel arm having a free end for connection to a rotatable tension roller which rests on the power transmission element, a swivel bearing, including an axle for connection to the swivel arm and a bushing forming part of the housing and supporting the axle, for rotatably supporting the swivel arm in the housing, a spring positioned in a peripheral zone of the swivel bearing between the swivel arm and the housing, a friction disk mounted in fixed rotative engagement to the axle and supported by the housing via a friction lining, and a disk-shaped dampening element positioned between the friction lining and the housing.

Through incorporation of a disk-shaped dampening element between the friction lining and the housing, the friction lining is effectively de-coupled from the housing so that a transmission of noise, generated in the contact area between the friction lining and friction disk, to the housing is effectively inhibited. This measure thus realizes an acoustic decoupling, i.e. a transmission of structure-borne noise is effectively eliminated. Suitably, the disk-shaped dampening element may be securely fixed to the housing and supported by the friction lining.

According to another feature of the present invention, a lid is received in the housing for covering a friction lining distal end face of the friction disk. This can be implemented, for example, by providing the housing with a collar which circumscribes the friction disk and is intended to center and secure the lid in place. The lid is suitably so positioned that a cavity is formed between the friction disk and the lid. Air conduction of noise emanating from the friction disk is hereby effectively eliminated.

Suitably, the friction lining is made of a material having a modulus of elasticity which significantly exceeds a modulus of elasticity of the disk-shaped dampening element. Varying material properties permit a desired high impedance jump between the disk-shaped dampening element and the friction lining. This is advantageous as far as sound absorption capability is concerned.

Sound absorption can be further enhanced by installing a second dampening element in the cavity between the friction disk and the lid. The second dampening element prevents a disadvantageous natural oscillation of the bottom which, without dampening action, acts like a sound board that amplifies the noise.

According to another feature of the present invention, the friction lining may be a separate component which can be installed in a radially centered location between the friction disk and the first dampening element. Through suitable material selection, it is possible to implement that a friction value between the disk-shaped dampening element and the housing significantly exceeds a friction value between the friction disk and the friction lining. This effectively inhibits a movement or displacement between the disk-shaped dampening element and the housing.

The friction lining may be combined with the disk-shaped dampening element to form a structural unit with is mounted rigidly to the housing so as to be constrained from executing a rotational movement. Depending on the material selection, these single components are secured together to the housing, preferably by a material connection, e.g. through ultrasonic sealing or gluing.

According to another feature of the present invention, the disk-shaped dampening element is formed in sandwich construction including two disks made of metallic material and spaced apart at formation of a circular intermediate space, and an elastic filler which fills the intermediate space. A disk-shaped dampening element in sandwich construction represents an optimum solution to provide a wear-resistant, long-lasting structure with an effective dampening action.

Moreover, the sandwich construction has the advantage that the disk-shaped dampening element can be pre-fabricated and can be easily suited to neighboring parts, that is the friction lining and the housing. In particular, when the friction lining is a separate component for use in the tensioner, involved here, the disk-shaped dampening element in sandwich construction can be advantageously be used to directly impact the friction value of the rubbing components in the area of the contact surface between the disk-shaped dampening element and the friction lining.

The effectiveness of the disk-like dampening element can be further enhanced through a torsionally stiff configuration and by a dampening action solely in axial direction. The use of such a dampening element is limited to the insulation of structure-borne noise, without influence of friction forces. The disk-shaped dampening element does not exhibit a dampening effect with respect to thrust and torsion and thus does not require an accordingly conformed or newly configured torsion spring and/or greater support surfaces of the spring ends on the housing for influencing the surface pressure.

According to another feature of the present invention, the friction lining has, at least in the area of the contact surface, a hardness which is equal or smaller than a material hardness of the friction disk. In this manner, an even wear of both rubbing components and an increased wear of the friction lining is realized. Thus, a one-sided wear of the friction disk is avoided, and a sufficient strength of the friction disk over the entire service life of the tensioner, utilized for the internal combustion engine, is assured.

Still another feature of the present invention relates to the rubbed-off material generated between the friction disk and the friction lining. To realize an optimum function and in particular to inhibit a noise development that may be experienced after smoothing the surface structure, it is advantageous to continuously remove abraded material released from the contact surface between interacting rubbing components. In this manner, penetration of finest abraded particles into the contact zone at a different location is eliminated. Tests have shown that a contamination of the contact surface by rubbed-off material adversely affects the friction behavior of the rubbing components and oftentimes amplifies a screeching sound of the contacting components in the area of the contact surface.

As the abraded material is predominately of metal, it is proposed according to the invention to provide magnetic strips in the area of the contact zone. A first one of the magnetic strips is disposed in an annular anchoring groove formed in a collar of the housing that circumscribes the friction disk. The anchoring groove covers hereby in concentric relation the contact zone between the friction lining and the friction disk. A second one of the magnetic strips is disposed, radially inwardly offset with respect to the friction lining, directly on the friction disk or on a ring collar which projects out in an axial direction from the friction disk.

The effectiveness of the dampened tensioner according to the present invention can be further enhanced when the second dampening element, disposed in the cavity that is axially bounded by the friction disk and the lid, bridges an axial distance between the lid and the friction disk and is rigidly secured to the friction disk or the lid. Material examples for the second dampening element include silicone or other suitable materials for partially filling the cavity. These materials are easy to incorporate and exhibit a permanent elasticity over the entire temperature range which the tensioner is exposed to.

The cavity may also have installed therein a disk-shaped insulating element which is suitably secured at the outer marginal zone of the friction disk and also bridges an axial distance to the lid. Of course, a disk-shaped insulating element may also be secured to the lid and supported by the friction disk. A suitable material for the insulating element is, for example, elastomer. A disk-shaped insulating element of this type can be reinforced by fabric inlays, e.g. acrylonitrile-butadiene rubber, or nitrile rubber (NBR or HNBR) to exhibit a sufficient strength and to further realize a needed high impedance jump for attaining an effective acoustic decoupling. Other materials suitable for use as insulating element include polyurethane foam (PU-foam) reinforced with fabric plies.

BRIEF DESCRIPTION OF THE DRAWING

The above and other objects, features and advantages of the present invention will be more readily apparent upon reading the following description of a preferred exemplified embodiment of the invention with reference to the accompanying drawing, in which.

DETAILED DESCRIPTION OF A PREFERRED EMBODIMENT

Figure 1:
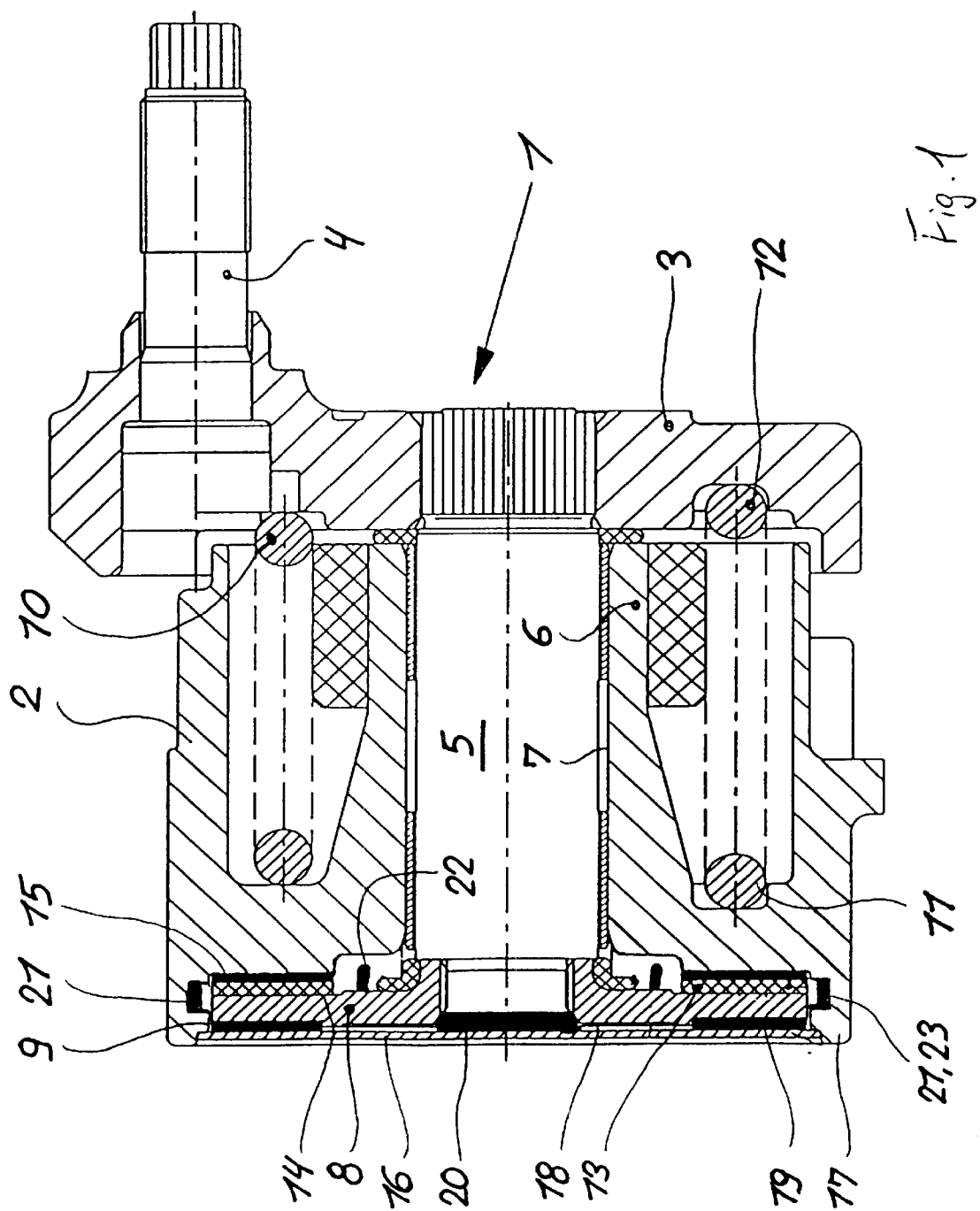
FIG. 1 shows a longitudinal section of a first embodiment of a tensioner according to the present invention.
Figure 2:
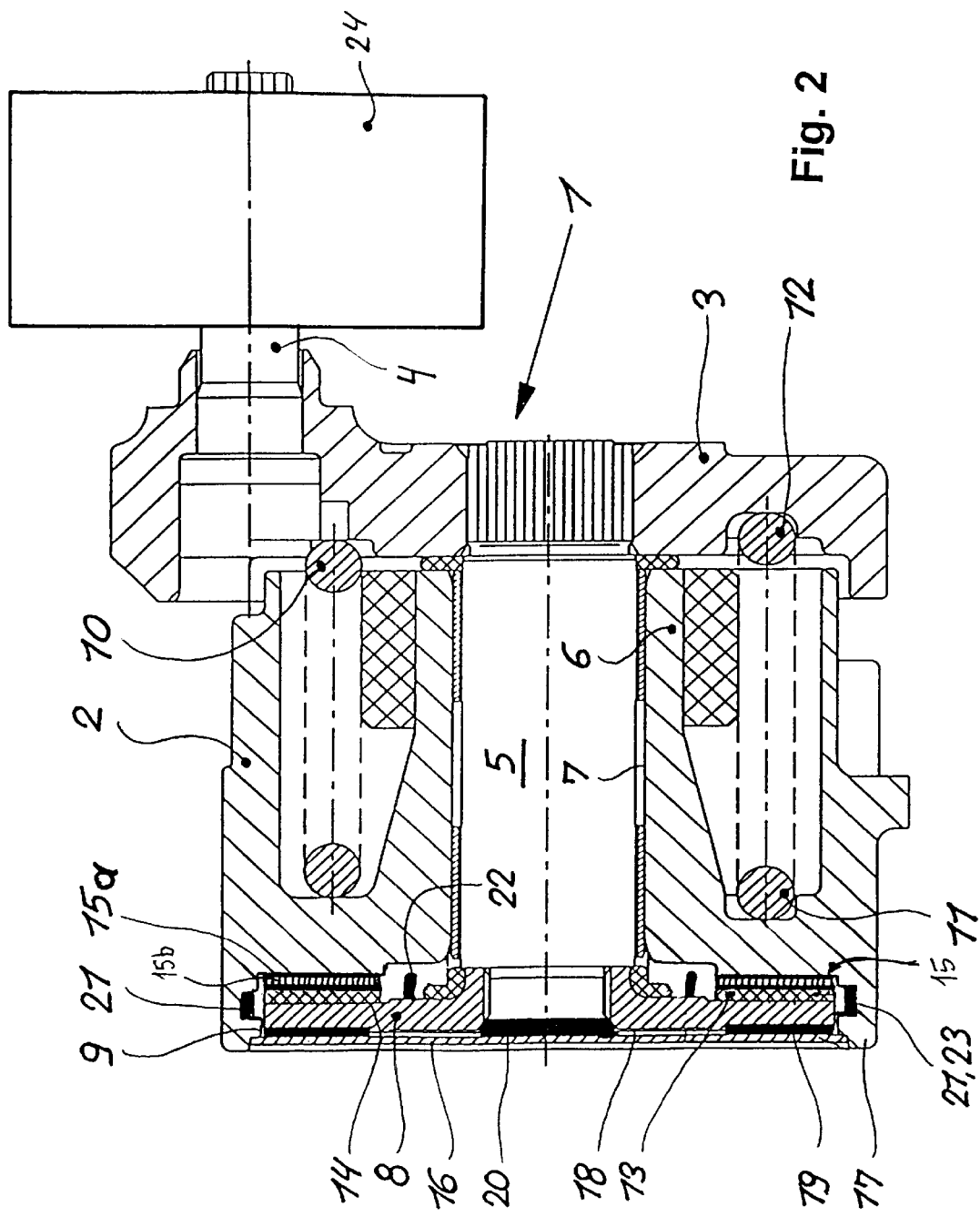
FIG. 2 shows a longitudinal section of a second embodiment of a tensioner according to the present invention.

Turning now to FIG. 1, there is shown a longitudinal section of a tensioner according to the present invention, generally designated by reference numeral 1, for tensioning a power transmission element, such as a belt or chain, of a traction drive. The tensioner 1 includes a housing 2 which is mounted to an internal combustion engine, preferably in fixed rotative engagement. The housing 2 has one end face for attachment of a swivel arm 3. On one end, the swivel arm 3 carries an axle 4, which projects outwardly in an axial direction, for attachment of a rotatable tension roller 24 (FIG. 2) that is in engagement with the power transmission element. At a central location, the swivel arm 3 is securely fixed to a further axle 5 by which the swivel arm 3 is rotatably supported in the housing 2, with the axle 5 being received in a longitude bore 7 of a bushing 6 formed centrally by the housing 2. At its end distal to the swivel arm 3, the axle 5 is secured in fixed rotative engagement with a friction disk 8 which is fitted in a recess 9 formed on one end face of the housing 2. Disposed in coaxial relation to the bushing 6 in the housing 2 is a torsion spring 10 having opposite ends 11, 12, securely fixed to the housing 2 and the swivel arm 3, respectively. The torsion spring 10 applies a force component that is directed for introduction into the swivel arm 3 to swing the swivel arm 3 in a direction to tense the power transmission element. The torsion spring 10 further applies an axial force between the swivel arm 3 and the housing 2 to hold the friction disk 8 in abutment with the housing 2 by a force.

The friction disk 8 is provided with a dampening unit for damping high-frequency adjusting movements as initiated by the traction drive via the swivel arm 3 into the tensioner 1. Hereby, the friction disk 8 has a housing-proximate end face which represents a contact surface 14 via which the friction disk 8 is held in contact with a friction lining 13. An acoustic decoupling, i.e. an interruption of structure-borne noise transmission of noise radiating from the contact surface 14 onto the housing 2, is realized by a disk-shaped dampening element 15 which is sandwiched between the friction lining 13 and the housing 2. The friction lining 13 is made of a material having a modulus of elasticity of >30 N/mm² which significantly exceeds a modulus of elasticity of the disk-shaped dampening element 15 which is <10 N/mm². Suitably, the friction value $\mu$ between the disk-shaped dampening element 15 and the housing 2 is $\mu \geqq 0.95$ and significantly exceeds the friction value $\mu$ between the friction disk and the friction lining 13 of $\mu=0.4$.

The friction lining 13 and the dampening element 15 may form a structural unit which is secured in fixed rotative engagement in the housing 2. Of course, the friction lining 13 may also be configured as a separate part which can be installed without consideration to a bearing orientation. The material or surface finish of the components sliding upon one another is so selected as to ensure that the friction force between the dampening element 15 and the friction lining 13 is greater than a friction force between the friction disk 8 and the friction lining 13. This feature ensures a friction movement only between the friction lining 13 and the friction disk 8.

A further sound absorption is realized by inserting a lid 16 from outside in a collar 17 which axially projects out in direction from the housing 2 in concentric surrounding relationship to the friction disk 8. The lid 16 further provides an effective protection against ingress of dirt or contaminants of any kind. As a consequence of the placement of the lid 16, a cylindrical cavity 18 is defined which is axially demarcated by the friction disk 8 and the lid 16 so as to completely protect the friction disk 8 at the end face. The cavity 18 is provided to receive at least one dampening element, e.g. a disk-shaped insulating element 19 and or a filler 20. As shown by way of example in FIG. 1, the cavity 18 has fitted therein a disk-shaped insulating element 19 in the peripheral area of the friction disk 8 and a filler 20 positioned in a central location of the cavity 18. Both, the insulating element 19 and the filler 20, bridge the axial distance between the friction disk 8 and the lid 16 and effectively eliminate the risk for the lid 16 to form a sound board that amplifies a screeching noise.

The tensioner 1 further includes means for accumulating abraded material released between the rubbing components friction disk 8 and friction lining 13 from the area of the contact surface 14, when the tensioner 1 is in operation. As both the friction disk 8 and the friction lining 13 are made of steel or steel components, magnetic strips 21, 22 are provided that attract the abraded material. The magnetic strip 21 is received in an annular anchoring groove 23 and arranged in concentric surrounding relation to the friction disk 8 and the friction lining 13 while overlapping the contact surface 14. The magnetic strip 22 is secured, radially inwardly offset to the friction lining 13, directly to the friction disk 8. As a consequence, abraded material released from the contact surface 14 radially to the outside is attracted by the magnetic strip 21, whereas abraded material released from the contact surface 14 radially to the inside is attracted by the magnetic strip 22.

While the invention has been illustrated and described as embodied in a mechanical tensioner with acoustic dampening feature, it is not intended to be limited to the details shown since various modifications and structural changes may be made without departing in any way from the spirit of the present invention.

What is claimed as new and desired to be protected by Letters Patent is set forth in the appended claims:

1. A tensioner for a power transmission element of a traction drive, comprising:
   a housing;
   a swivel arm having a free end for connection to a rotatable tension roller which rests on the power transmission element;
   a swivel bearing for rotatably supporting the swivel arm in the housing, said swivel bearing including an axle for connection to the swivel arm and a bushing forming part of the housing and supporting the axle;
   a spring positioned in a peripheral zone of the swivel bearing between the swivel arm and the housing;
   a friction disk mounted in fixed rotative engagement to the axle and supported by the housing via a friction lining; and
   a disk-shaped first dampening element positioned between the friction lining and the housing to thereby decouple the friction lining from the housing to effectively prevent transmission of structure-borne noise,
   wherein the friction lining is made of a material having a modulus of elasticity which exceeds a modulus of elasticity of the first dampening element.

2. The tensioner of claim 1, and further comprising a lid received in the housing for covering an end face of the friction disk, said lid and said friction disk bounding a cavity.

3. The tensioner of claim 2, and further comprising a second dampening element positioned in the cavity.

4. The tensioner of claim 3 wherein the second dampening element bridges an axial distance in the cavity between the lid and the friction disk and is securely fixed to at least one of the lid and the friction disk.

5. The tensioner of claim 3 wherein the second dampening element is a filler received in a central area of the cavity for connecting the lid with the friction disk.

6. The tensioner of claim 3, and further comprising a disk-shaped insulating element mounted to a cavity-facing side of the friction disk.

7. The tensioner of claim 1 wherein the friction lining is a separate component centered between the friction disk and the first dampening element.

8. The tensioner of claim 1 wherein a friction value between the first dampening element and the housing exceeds a friction value between the friction disk and the friction lining.

9. The tensioner of claim 1 wherein the friction lining is rigidly mounted in fixed rotative engagement to the first dampening element.

10. The tensioner of claim 1 wherein the first dampening element is formed in sandwich construction including two disks made of metallic material and spaced apart at formation of a circular intermediate space, and an elastic filler which fills the intermediate space.

11. The tensioner of claim 1 wherein the first friction lining and the friction disk define a contact surface, with the friction lining having on a contact surface-proximal side-a hardness which is equal or smaller than a hardness of the friction disk.

12. The tensioner of claim 11 wherein rubbed-off material generated between the friction disk and the friction lining and released from the contact surface is accumulated in the housing.

13. The tensioner of claim 11 wherein the housing is formed with an axially projecting collar which circumscribes the friction disk, and further comprising a magnetic strip disposed in the collar in concentric surrounding relation to the contact surface between-the friction lining and the friction disk.

14. The tensioner of claim 11, and further comprising a magnetic strip projecting out in an axial direction from the friction disk at a location radially inwardly offset with respect to the friction lining.

15. The tensioner of claim 1 wherein-the first dampening element has a stiff configuration and acts only in axial direction.

16. The tensioner of claim 1 wherein the first dampening element is made of fabric inlays of reinforced plastic material.

17. The tensioner of claim 16 wherein the first dampening element is made of an elastomer together with a material selected from the group consisting of acrylonitrile-butadiene rubber, nitrile rubber (NBR), and a polyurethane foam (PU-foam) reinforced with fabric inlays.

18. The tensioner of claim 3, wherein a friction force between the dampening element and the friction lining is greater than a friction force between the friction disk and the friction lining.

19. A tensioner for a power transmission element, comprising:

a housing;

a swivel arm rotatably supported in the housing and having one end carrying an engaging member, said swivel arm being spring-loaded for urging the engaging member against the power transmission element, a friction mechanism interacting with the swivel arm;

a first dampening element positioned between the friction mechanism and the housing for preventing a transmission of noise to the housing; and collecting means, positioned in the housing, for gathering rubbed-off material generated between the friction disk and the friction lining and released from the contact surface, wherein the collecting means includes a magnetic strip disposed in a collar of the housing in concentric surrounding relation to the friction mechanism.

20. The tensioner of claim 19, and further comprising a lid for closing the housing, and a second dampening element placed between the lid and the friction mechanism.

21. A tensioner for a power transmission element, comprising:

a housing;

a swivel arm rotatably supported in the housing and having one end carrying an engaging member, said swivel arm being spring-loaded for urging the engaging member against the power transmission element, a friction mechanism interacting with the swivel arm;

a first dampening element positioned between the friction mechanism and the housing for preventing a transmission of noise to the housing; and collecting means, positioned in the housing, for gathering rubbed-off material generated between the friction disk and the friction lining and released from the contact surface, wherein the collecting means includes a magnetic strip disposed in a space between the friction mechanism and the housing.

22. The tensioner of claim 21, and further comprising a lid for closing the housing, and a second dampening element placed between the lid and the friction mechanism.

* * * * *